(12) United States Patent
Taniguchi et al.

(10) Patent No.: US 11,820,065 B2
(45) Date of Patent: Nov. 21, 2023

(54) CONDUCTIVE CIRCUIT-ATTACHED MOLDED PRODUCT AND MANUFACTURING METHOD FOR THE SAME, AND CONDUCTIVE CIRCUIT-ATTACHED PREFORM AND MANUFACTURING METHOD FOR THE SAME

(71) Applicant: Nissha Co., Ltd., Kyoto (JP)

(72) Inventors: Chuzo Taniguchi, Kyoto (JP); Satoshi Wada, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 115 days.

(21) Appl. No.: 17/262,678

(22) PCT Filed: Jun. 13, 2019

(86) PCT No.: PCT/JP2019/023415
§ 371 (c)(1),
(2) Date: Jan. 22, 2021

(87) PCT Pub. No.: WO2020/021899
PCT Pub. Date: Jan. 30, 2020

(65) Prior Publication Data
US 2021/0299933 A1    Sep. 30, 2021

(30) Foreign Application Priority Data
Jul. 23, 2018   (JP) .................................. 2018-137563

(51) Int. Cl.
*B29C 49/20* (2006.01)
*B65D 1/02* (2006.01)
(Continued)

(52) U.S. Cl.
CPC .............. *B29C 49/20* (2013.01); *B29B 11/08* (2013.01); *B29C 49/06* (2013.01); *B65D 1/02* (2013.01);
(Continued)

(58) Field of Classification Search
CPC ............ B29C 49/20; B29C 2049/2008; B29C 2049/2071; B65D 1/02
See application file for complete search history.

(56) References Cited

U.S. PATENT DOCUMENTS 7,875,227 B2 * 1/2011 Chisholm ......... B29C 45/14065
264/275
8,875,425 B2 * 11/2014 Moretti .................. A45D 34/02
40/310
(Continued)

FOREIGN PATENT DOCUMENTS

JP           11170346 A  *  6/1999  ............. B65D 23/12
JP         2000326393 A  *  11/2000  ............. B29C 43/42
(Continued)

OTHER PUBLICATIONS

Mechanical translation of WO 2017/056608 A1 dated Apr. 2017. (Year: 2017).*

*Primary Examiner* — Robert B Davis
(74) *Attorney, Agent, or Firm* — JCIPRNET

(57) ABSTRACT

A manufacturing method is configured to include arranging a conductive circuit-attached film, in which a conductive circuit having stretchability is formed on a base film, on a molding surface of a first mold having the molding surface for forming an internal surface of a preform; mold-clamping the first mold and a second mold paired with the first mold; molding the preform by injecting molten resin into a cavity (Continued)

formed by the mold-clamping; mold-opening the first mold and the second mold; taking out a conductive circuit-attached preform in which the conductive circuit-attached film and the preform are integrated; and blow-molding the conductive circuit-attached preform.

16 Claims, 10 Drawing Sheets

(51) Int. Cl.
*B29B 11/08* (2006.01)
*B29C 49/06* (2006.01)

(52) U.S. Cl.
CPC ............... *B29C 2049/2008* (2013.01); *B29C 2049/2071* (2022.05)

(56) References Cited

U.S. PATENT DOCUMENTS

| | | | |
|---|---|---|---|
| 2001/0021356 A1* | 9/2001 | Konrad | ............... B01L 3/5453 215/230 |
| 2005/0068182 A1* | 3/2005 | Dunlap | ............ G06K 19/07758 340/572.8 |
| 2007/0182562 A1* | 8/2007 | Abbott | .................... B29C 45/14 340/5.92 |
| 2010/0052215 A1* | 3/2010 | Emond | ............. B29C 45/14065 264/275 |
| 2013/0015193 A1* | 1/2013 | Lien | ......................... G01V 3/08 220/694 |
| 2017/0361519 A1 | 12/2017 | Nissha | |

FOREIGN PATENT DOCUMENTS

| | | | | |
|---|---|---|---|---|
| JP | 2016-107540 | | 6/2016 | |
| WO | WO-2009152883 A1 | * | 12/2009 | ............. B29C 49/20 |
| WO | WO-2017056608 A1 | * | 4/2017 | ............. B29C 49/02 |

* cited by examiner (a)

(b)

(c)

(d)

(e)

CONDUCTIVE CIRCUIT-ATTACHED MOLDED PRODUCT AND MANUFACTURING METHOD FOR THE SAME, AND CONDUCTIVE CIRCUIT-ATTACHED PREFORM AND MANUFACTURING METHOD FOR THE SAME

CROSS REFERENCE TO RELATED APPLICATIONS

This application is a continuation of International Application No. PCT/JP2019/023415, filed on Jun. 13, 2019, which claims priority to Japanese Patent Application 2018-137563, filed on Jul. 23, 2018, which is incorporated herein by reference.

TECHNICAL FIELD

The present disclosure relates to a molded product with a conductive circuit attached (conductive circuit-attached molded product) and a manufacturing method for the same, and a preform with a conductive circuit attached (conductive circuit-attached preform) and a manufacturing method for the same.

BACKGROUND

Plastic bottles for containing beverages, food, chemicals, and the like can be achieved by arranging a preform in a mold and then performing biaxial stretching blow molding. To add various functions to plastic bottles, a composite preform 14 having a functional film 16 adhered to the outside of a preform 15 has been developed (see, for example, Japan Unexamined Patent Publication No. 2016-107540 and FIG. 10(a)). The functional film 16 has functions of a gas barrier, decoration, heat/cold insulation, and the like. When the above-described composite preform 14 is subjected to biaxial stretching blow molding, a plastic bottle 17, to which these functions are added, may be achieved (see FIG. 10(b)).

However, none of a preform integrated with a film with a conductive circuit attached (conductive circuit-attached film) and a molded product formed by blow-molding the above-described preform have not been provided yet. Further, even in a case where a conventional functional film as described in Japan Unexamined Patent Publication No. 2016-107540 is provisionally replaced with a conductive circuit-attached film, the following concerns are raised.
  (1) Because the conductive circuit-attached film is in close contact with the outside of a preform, heat of a heater during blow molding is unlikely to be applied to the preform.
  (2) Because the conductive circuit-attached film is a different member from the preform and is in close contact with the preform, the conductive circuit-attached film is unlikely to follow the stretch of the preform during the blow molding.
  (3) Because the conductive circuit-attached film is present outside of the preform, the film can be easily counterfeited by replacing the film with a counterfeit one.

SUMMARY

The present disclosure provides a conductive circuit-attached molded product where a conductive circuit-attached film follows the stretch of a preform and the conductive circuit is hard to be counterfeited, and to provide a manufacturing method for the above-described molded product. The present disclosure also provides a conductive circuit-attached preform easy to be blow-molded in which a conductive circuit-attached film is able to follow the stretch of the preform and the conductive circuit is hard to be counterfeited, and to provide a manufacturing method for the above-described preform.

Some aspects of the present disclosure will be described below. These aspects can be combined optionally, as needed.

A manufacturing method for a conductive circuit-attached molded product according to the present disclosure is a method including:
  a step of arranging a conductive circuit-attached film, in which a conductive circuit having stretchability is formed on a base film, on a molding surface of a first mold having the molding surface for forming an internal surface of a preform;
  a step of mold-clamping the first mold and a second mold paired with the first mold;
  a step of molding the preform by injecting molten resin into a cavity formed by the mold-clamping;
  a step of mold-opening the first mold and the second mold;
  a step of taking out a conductive circuit-attached preform in which the conductive circuit-attached film and the preform are integrated; and
  a step of blow-molding the conductive circuit-attached preform.

The molding surface on which the conductive circuit-attached film is arranged may be at least one location among the molding surfaces for forming a mouth, a body, and a base portion of the preform.

The conductive circuit-attached film may have a touch sensor structure.

The manufacturing method may further include a step of mounting an electronic component on the conductive circuit or the base film in such a manner that the electronic component is electrically connected to the conductive circuit.

In addition, the manufacturing method may further include a step of mounting an electronic component on the conductive circuit-attached molded product in such a manner that the electronic component is electrically connected to the conductive circuit.

A manufacturing method for a conductive circuit-attached preform according to the present disclosure is a method including:
  a step of arranging a conductive circuit-attached film, in which a conductive circuit having stretchability is formed on a base film, on a molding surface of a first mold having the molding surface for forming an internal surface of a preform;
  a step of mold-clamping the first mold and a second mold paired with the first mold;
  a step of molding the preform by injecting molten resin into a cavity formed by the mold-clamping;
  a step of mold-opening the first mold and the second mold; and
  a step of taking out a conductive circuit-attached preform in which the conductive circuit-attached film and the preform are integrated.

A conductive circuit-attached molded product according to the present disclosure is a conductive circuit-attached molded product achieved by blow molding, where a conductive circuit-attached film in which a conductive circuit having stretchability is formed on a base film, is integrally molded on an internal surface of the conductive circuit-attached molded product.

A conductive circuit-attached preform according to the present disclosure is a preform configured to achieve a conductive circuit-attached molded product by blow molding, and the preform including a conductive circuit-attached film in which a conductive circuit having stretchability is formed on a base film, and which is arranged on an internal surface of the preform.

The conductive circuit-attached preform may further include an electronic component mounted on the conductive circuit or the base film in such a manner that the electronic component is electrically connected to the conductive circuit.

A manufacturing method for a conductive circuit-attached molded product according to the present disclosure is configured to include: a step of arranging a conductive circuit-attached film, in which a conductive circuit having stretchability is formed on a base film, on a molding surface of a first mold having the molding surface for forming an internal surface of a preform; a step of mold-clamping the first mold and a second mold paired with the first mold; a step of molding the preform by injecting molten resin into a cavity formed by the mold-clamping; a step of mold-opening the first mold and the second mold; a step of taking out a conductive circuit-attached preform in which the conductive circuit-attached film and the preform are integrated; and a step of blow-molding the conductive circuit-attached preform.

Thus, according to the manufacturing method for a conductive circuit-attached molded product of the present disclosure, it is possible to easily achieve a conductive circuit-attached molded product in which a conductive circuit-attached film follows the stretch of the preform, and the conductive circuit is hard to be counterfeited.

A manufacturing method for a conductive circuit-attached preform according to the present disclosure is configured to include: a step of arranging a conductive circuit-attached film, in which a conductive circuit having stretchability is formed on a base film, on a molding surface of a first mold having the molding surface for forming an internal surface of a preform; a step of mold-clamping the first mold and a second mold paired with the first mold; a step of molding the preform by injecting molten resin into a cavity formed by the mold-clamping; a step of mold-opening the first mold and the second mold; and a step of taking out a conductive circuit-attached preform in which the conductive circuit-attached film and the preform are integrated.

Thus, according to the manufacturing method for a conductive circuit-attached preform of the present disclosure, a conductive circuit-attached preform may be easily achieved, where it is easy to perform blow molding when manufacturing a conductive circuit-attached molded product by blow molding, a conductive circuit-attached film is able to follow the stretch of the preform, and the conductive circuit is hard to be counterfeited.

A conductive circuit-attached molded product according to the present disclosure is a conductive circuit-attached molded product achieved by blow molding, and is configured such that a conductive circuit-attached film in which a conductive circuit having stretchability is formed on a base film, is integrally molded on an internal surface of the conductive circuit-attached molded product.

Thus, the conductive circuit-attached molded product of the present disclosure is a molded product in which a film with a conductive circuit follows the stretch of the preform, and the conductive circuit are not easily counterfeited.

A conductive circuit-attached preform according to the present disclosure is a preform that is used for achieving a conductive circuit-attached molded product by blow molding, and is configured to include a conductive circuit-attached film in which a conductive circuit having stretchability is formed on a base film, and which is arranged on an internal surface of the preform.

Thus, the conductive circuit-attached preform of the present disclosure is a preform that makes it easy to perform blow molding when manufacturing a conductive circuit-attached molded product by blow molding, and allows a conductive circuit-attached film to follow the stretch of the preform. In addition, it is hard to counterfeit the conductive circuit.

DETAILED DESCRIPTION

Hereinafter, an example of an embodiment of a conductive circuit-attached molded product and a manufacturing method therefor, and a conductive circuit-attached preform and a manufacturing method therefor of the present disclosure will be described with reference to the drawings.

Figure 1:
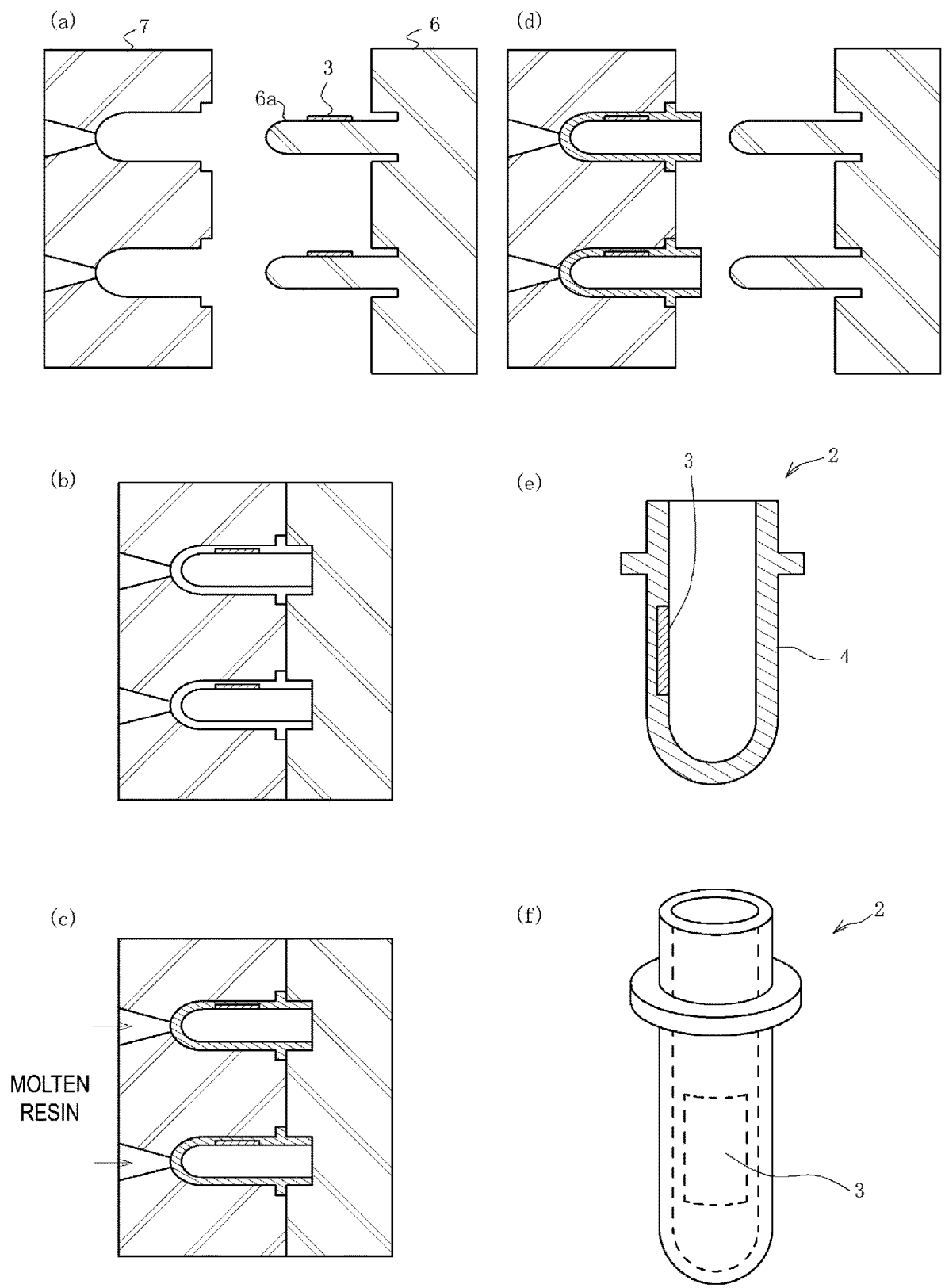
FIGS. 1(a) to 1(e) are schematic cross-sectional views illustrating an embodiment of a manufacturing method for a conductive circuit-attached preform according to the present disclosure.
FIG. 1(f) is a schematic perspective view illustrating an example of a conductive circuit-attached preform.
Figure 3:
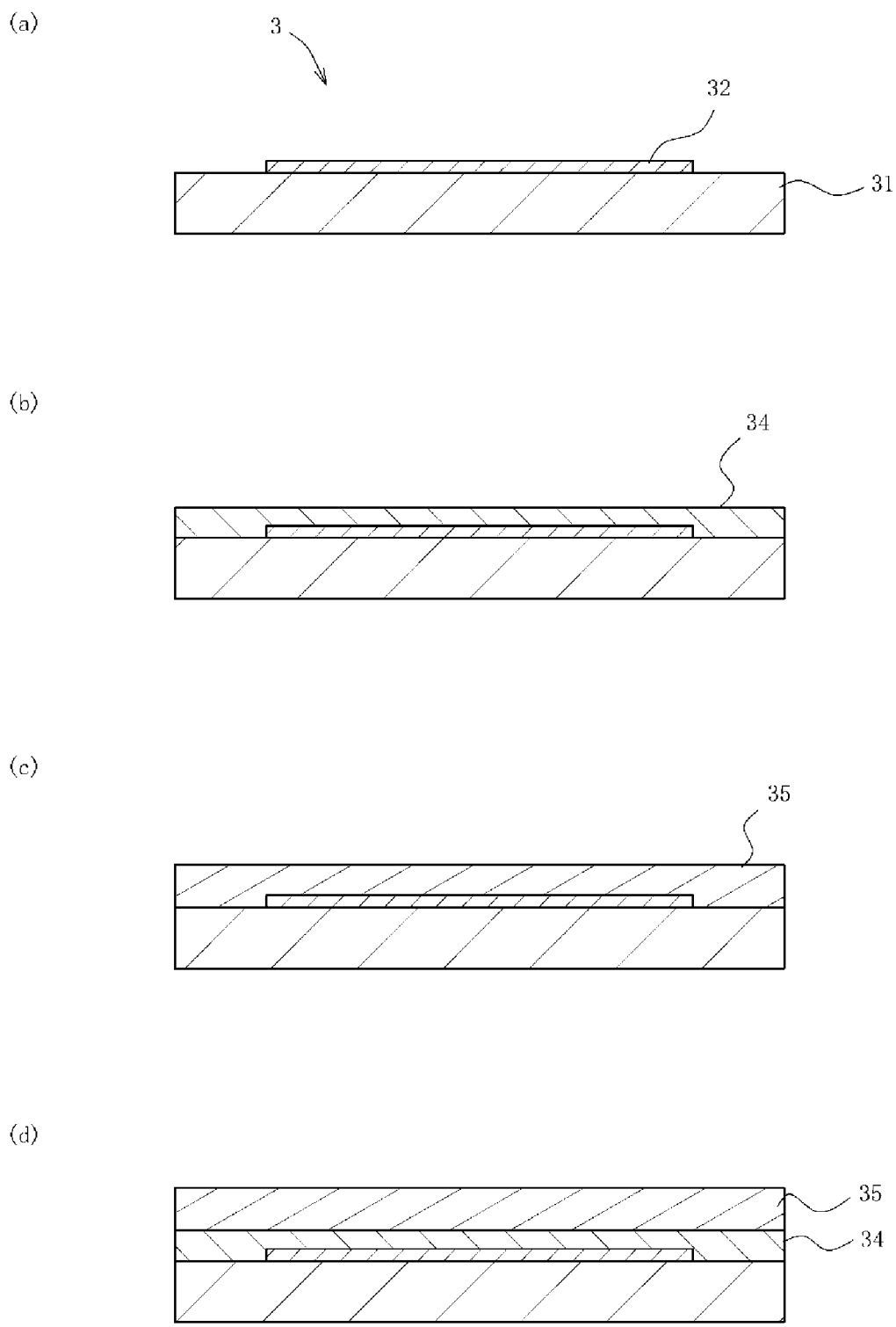
FIG. 3 is a schematic cross-sectional view illustrating an example of a conductive circuit-attached film.

A manufacturing method for a conductive circuit-attached preform of the present disclosure is a method including a step of arranging a conductive circuit-attached film 3, in which a conductive circuit 32 having stretchability is formed on a base film 31, on a molding surface 6a of a first mold 6 having the molding surface for forming an internal surface of a preform; a step of mold-clamping the first mold 6 and a second mold 7 paired with the first mold; a step of molding a preform 4 by injecting molten resin into a cavity formed by the mold-clamping; a step of mold-opening the first mold 6 and the second mold 7; and a step of taking out a conductive circuit-attached preform 2, in which the conductive circuit-attached film 3 and the preform 4 are integrated (see FIGS. 1 and 3).

The conductive circuit-attached film 3 is a film in which the conductive circuit 32 having stretchability is formed on the base film 31 (see FIG. 3(a)). The material of the base film 31 is not particularly limited as long as the material can be stretched when heat is applied thereto. For example, polyethylene terephthalate, polyethylene, polyvinyl chloride, polyethylene naphthalate, polypropylene, polycarbonate, acrylic, urethane, and a composite material thereof may be used. Note that the material of the base film 31 may be the same as or different from resin that forms the preform 4. It is preferable that the material thereof be the same as the resin described above because the base film 31 is able to more easily follow the stretch of the preform during blow molding.

The conductive circuit 32 is formed using ink. Ink containing a material having conductivity and stretchability is used. Such material may include any one of silver, poly(3, 4-ethylene dioxythiophene) (PEDOT), carbon black, and carbon nanotubes. When PEDOT is used, polystyrene sulfonic acid (PSS) is preferably added because PEDOT is hardly soluble in water or a solvent. These materials are dispersed as particles in the ink. In the ink, a binder is contained. The particles are dispersed in the ink by the binder, and the binder carries the particles. Due to the binder being contained, the ink can firmly adhere to the application surface. The ink may contain a curing agent, a solvent, or other additives.

Examples of the binder include epoxy resin, polyester resin, acrylic resin, urethane resin, phenolic resin, polyimide resin, and elastomer resin. Any of these resins may be used alone, or two or more of them may be mixed and used. It is preferable that the weight ratio of the particles to the binder be 20:80 to 99:1, and is more preferable that the stated ratio be 60:40 to 80:20. When the weight ratio of the particles is less than 20, troubles such as a decrease in conductivity and an increase in resistance of the formed conductive circuit may occur. On the other hand, when the weight ratio of the binder is less than 1, since the particles are not uniformly dispersed, troubles such as a decrease in conductivity and an increase in resistance may occur. In addition, due to a decrease in adhesion to the ink application surface, when a conductive circuit-attached preform 2 is blow-molded, troubles such as wire breakage of the conductive circuit 32, peeling of the conductive circuit 32 from the base film 31 and the like may occur.

Note that an adhesive layer 35 may be provided on the conductive circuit-attached film 3 in order to increase adhesive strength between the conductive circuit-attached film 3 and the preform 4 (see FIG. 3(c)). The adhesive layer 35 may be formed over the entire surface of the base film 31 as illustrated in FIG. 3(c), or may be partially formed. As a material for the adhesive layer 35, acrylic-based resin, urethane-based resin, vinyl-based resin, vinyl chloride-vinyl acetate copolymer, epoxy-based resin, polyester-based resin, a composite material of these resins, or the like may be used. The adhesive layer 35 may be formed with an ink-like material transformed from the above-described material, by using a printing method such as screen printing, or may be formed by laminating an adhesive film containing the above-described material on the conductive circuit-attached film 3.

Arrangement Step

Figure 4:
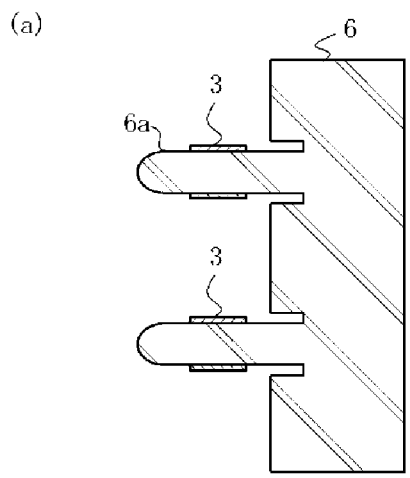
FIG. 4 is a schematic cross-sectional view illustrating an example of an arrangement location of a conductive circuit-attached film with respect to a mold.
Figure 4:
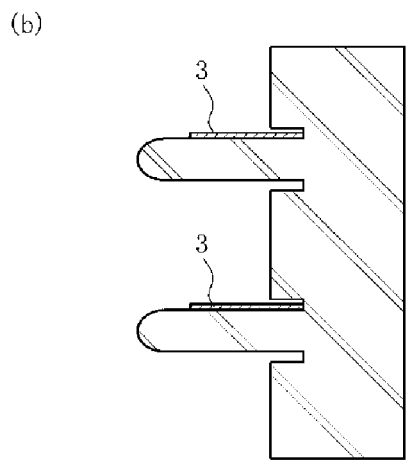
Figure 4:
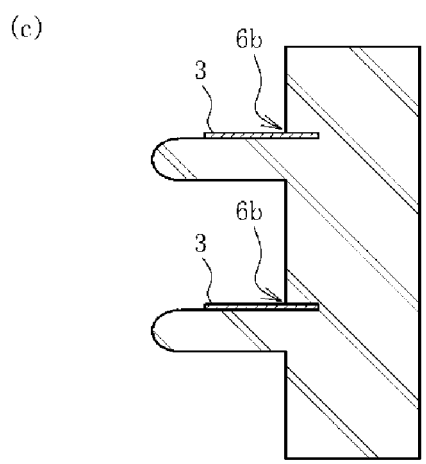
Figure 4:
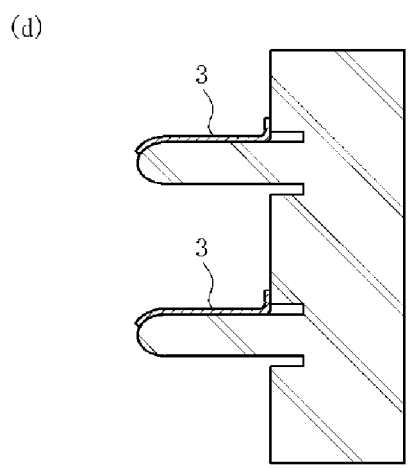
Figure 4:
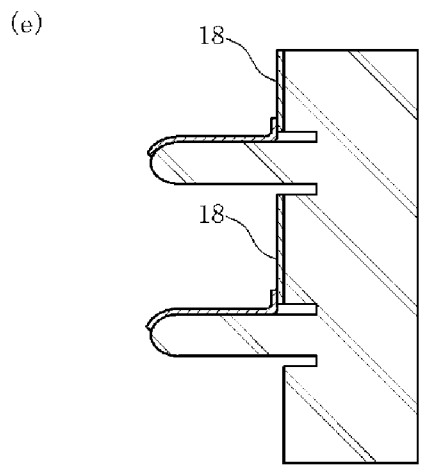
Figure 5:
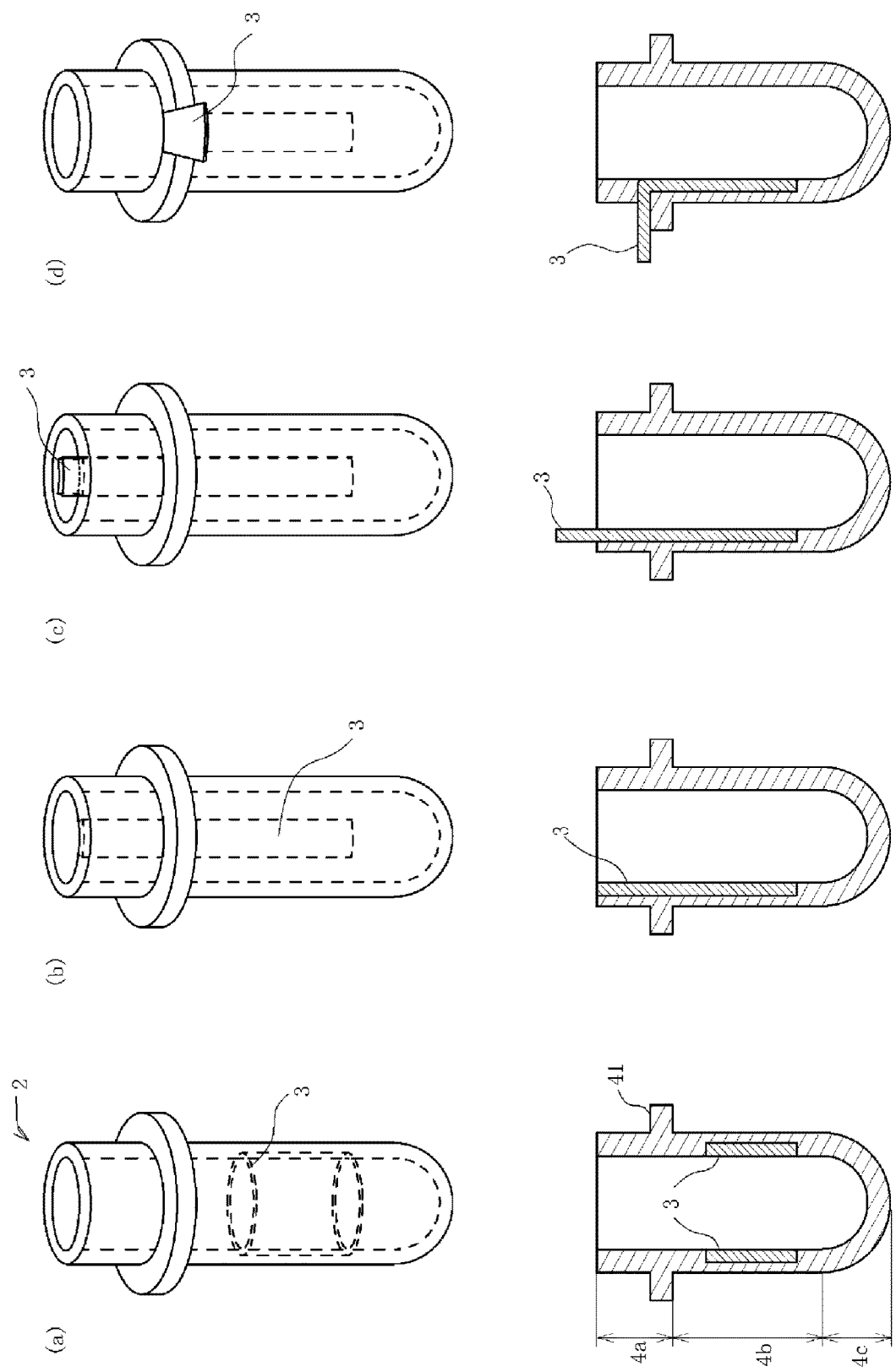
FIG. 5 includes schematic cross-sectional views and perspective views illustrating preforms, each integrally molded with a conductive circuit-attached film, corresponding to FIGS. 4(a) to 4(e).

The conductive circuit-attached film 3 is arranged on the molding surface 6a of the first mold 6 having the molding surface for forming the internal surface of the preform (see FIG. 1(a)). The conductive circuit-attached film 3 may be fixed to the molding surface 6a by vacuum drawing through a suction hole (not illustrated) formed in the molding surface 6a. The molding surface on which the conductive circuit-attached film 3 is arranged may be at least one location among the molding surfaces for forming a mouth 4a, a body 4b, and a base portion 4c of the preform (see FIGS. 4 and 5). These arrangement locations may be optionally determined in accordance with the application of a conductive circuit-attached molded product 1. The mouth 4a extends from an opening to a lower surface of a neck ring 41 of the preform 4, the body 4b is joined to the lower surface of the neck ring 41, and the base portion 4c is joined to the lower side of the body 4b (see FIG. 5(a)).

When the conductive circuit-attached film 3 is arranged on the molding surface 6a, the arrangement may be performed in such a manner as to make the base film 31 in contact with the molding surface 6a or make the conductive circuit 32 in contact with the molding surface 6a. In addition, a protective layer 34 may be provided on the conductive circuit 32 (see FIG. 3(b)). The protective layer 34 serves to protect the conductive circuit 32 from heat of the molten resin or the like, or to protect the conductive circuit 32 from corrosion, shock, or the like caused by a liquid, solid, or the like accommodated in the conductive circuit-attached molded product 1. When the protective layer 34 is formed, the adhesive layer 35 is formed on the protective layer 34 (see FIG. 3(d)).

The conductive circuit-attached film 3 may be formed in a cylindrical shape to be arranged on the molding surface 6a for forming the internal surface of the preform as illustrated in FIG. 4(a). By doing so, the conductive circuit-attached film 3 can be integrated on the internal surface of the preform in such a manner as to surround the circumference of the preform (see FIG. 5(a)). In the conductive circuit-attached molded product 1 achieved by blow-molding the above-described conductive circuit-attached preform, it is possible to generate electromagnetic induction by using the conductive circuit, and efficiently heat an object accommodated in the conductive circuit-attached molded product 1 from the periphery of the object, for example. By the heating, the conductive circuit-attached molded product 1 may be prevented from being clouded.

The conductive circuit-attached film 3 may be arranged on the molding surface 6a extending from the mouth to the body as illustrated in FIG. 4(b). By doing so, the conductive circuit-attached film 3 can be integrated extending from the mouth 4a to the body 4b of the preform (see FIG. 5(b)).

The conductive circuit-attached film 3 may be arranged on the molding surface 6a extending from the mouth to the body as illustrated in FIG. 4(c). In the vicinity of the mouth of the first mold 6, a slit 6b having a thickness approximately equal to that of the conductive circuit-attached film 3 is formed, for example, and one end of the conductive circuit-attached film 3 is arranged in the slit 6b. By doing so, the conductive circuit-attached film 3 can be integrated extending from the mouth 4a to the body 4b of the preform, and it is possible to achieve the conductive circuit-attached preform 2, in which part of the conductive circuit-attached film 3 is protruded from the mouth 4a (the opening of the preform 4) toward the outside of the preform (see FIG. 5(c)).

The conductive circuit-attached film 3 may be arranged on the molding surface 6a extending from the mouth to the base portion as illustrated in FIG. 4(d). At this time, a portion of the conductive circuit-attached film 3 corresponding to the mouth may be in contact with a parting line surface of the mold. Note that an elastic member 18 may be arranged on the parting line surface in order to prevent wire breakage of the conductive circuit from occurring during mold-clamping (see FIG. 4(e)). The elastic member 18 may be arranged on a parting line surface of the second mold 7. By doing so, the conductive circuit-attached film 3 can be integrated extending from the mouth 4a to the base portion 4c of the preform, and it is possible to achieve the conductive circuit-attached preform 2, in which part of the conductive circuit-attached film 3 is protruded from the upper surface of the neck ring 41 toward the outside of the preform (see FIG. 5(d)).

Mold-Clamping Step

After the arrangement of the conductive circuit-attached film 3, the first mold 6 and the second mold 7 paired with the first mold are mold-clamped (see FIG. 1(b)). In the drawings, the first mold 6 is a movable mold and the second mold 7 is a stationary mold, but reversely, the first mold 6 may be a stationary mold and the second mold 7 may be a movable mold.

Molding Step

Next, molten resin is injected into a cavity formed by the mold-clamping to form the preform 4 (see FIG. 1(c)). As the resin, for example, polyethylene terephthalate, polyethylene, polyvinyl chloride, polyethylene naphthalate, polypropylene or the like may be used.

Mold-Opening Step

Next, the first mold 6 and the second mold 7 are mold-opened (see FIG. 1(d)), and the conductive circuit-attached preform 2, in which the conductive circuit-attached film 3 and the preform 4 are integrated, is taken out (see FIG. 1(e)).

In this manner, it is possible to achieve the conductive circuit-attached preform 2 provided with the conductive circuit-attached film 3, in which the conductive circuit 32 having stretchability is formed on the base film 31, on the internal surface of the preform 4.

Figure 2:
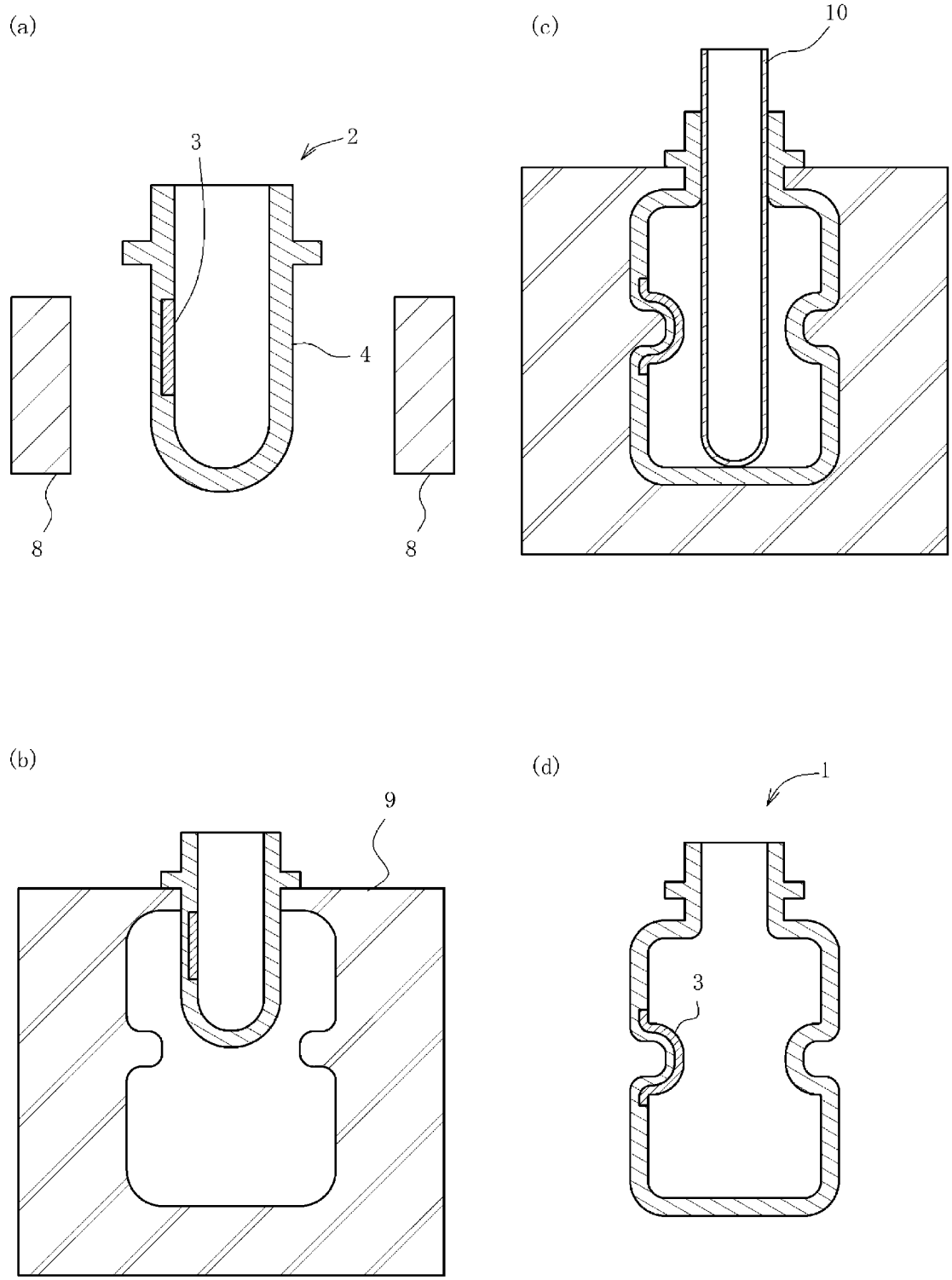
FIG. 2 is a schematic cross-sectional view illustrating one embodiment of a conductive circuit-attached molded product according to the present disclosure.

By blow-molding the conductive circuit-attached preform 2, the conductive circuit-attached molded product of the present disclosure can be achieved. Here, the blow-molding in this case refers to biaxial stretching blow molding. In the blow-molding, a heater 8 heats and softens the conductive circuit-attached preform 2 first (see FIG. 2(a)). The heating temperature by the heater 8 may be set to 50° C. to 150° C. Next, the softened conductive circuit-attached preform 2 is set in a mold 9 (see FIG. 2(b)). The temperature of the mold 9 may be set to 100° C. to 250° C. Next, the conductive circuit-attached preform 2 is stretched by a stretching rod 10, compressed air is supplied from the stretching rod 6 into the conductive circuit-attached preform 2, and the conductive circuit-attached molded product 1 is molded (see FIG. 2(c)). Finally, the conductive circuit-attached molded product 1 is taken out from the mold 9 (see FIG. 2(d)).

In the conventional art, since a functional film is provided on the outside of a preform or a molded product, it is possible to easily make a counterfeit product by replacing the functional film with a counterfeit one. On the other hand, in the conductive circuit-attached preform and the conductive circuit-attached molded product of the present disclosure, the conductive circuit-attached film is integrally molded at the inside thereof. Therefore, it is difficult to make a counterfeit product by replacing the conductive circuit-attached film with a counterfeit one. In addition, it is also difficult to make a falsified product by falsifying the conductive circuit (falsification).

Figure 6:
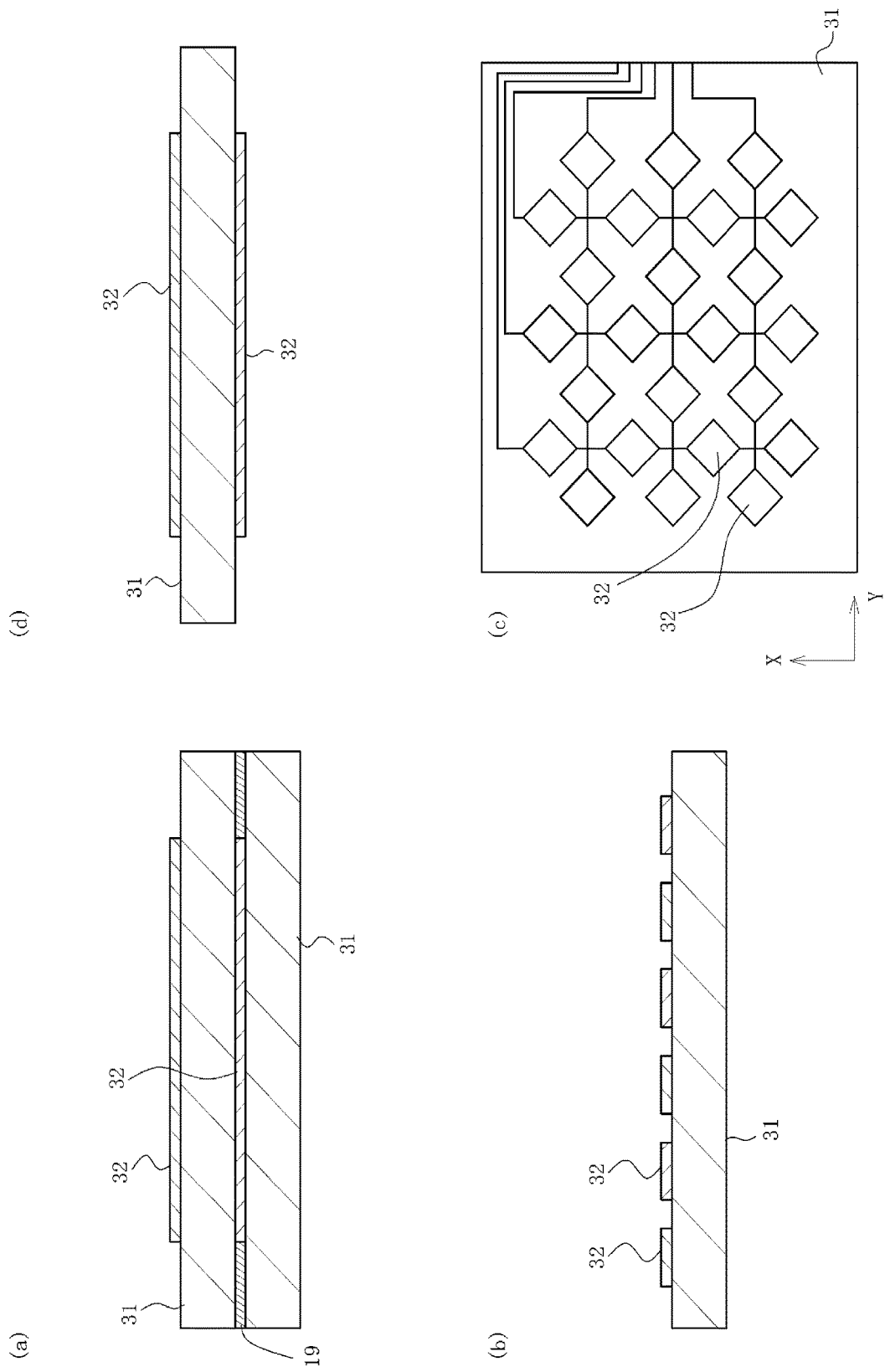
FIG. 6 is a schematic cross-sectional view illustrating an example of a touch sensor structure.

The conductive circuit-attached film 3 may have a touch sensor structure (see FIG. 6). As a touch sensor, for example, a capacitive touch sensor, a capacitive pressure sensor or the like may be used. The capacitive touch sensor may employ a self-capacitance scheme or a mutual capacitance scheme. In the case of the mutual capacitance scheme, since the touch sensor operates even when a liquid adheres to the touch sensor, the touch sensor function may be used even when the liquid is accommodated in the conductive circuit-attached molded product 1.

FIG. 6 illustrates an example of a touch sensor structure. FIG. 6(a) illustrates a structure in which conductive circuits 32 are formed, as electrodes or wiring lines, on two base films 31 respectively, and the conductive circuit 32 and the base films 31 are stuck to each other with an adhesive 19. For example, an optical clear adhesive (OCA) may be used as the adhesive 19. FIGS. 6(b) and 6(c) illustrate a structure in which a single layer including conductive circuits (electrodes and wiring lines) is formed on a single base film 31, where FIG. 6(b) is a cross-sectional view of FIG. 6(c). As illustrated in FIG. 6(c), the electrodes are formed in a matrix shape. FIG. 6(d) illustrates a structure in which conductive circuits (electrodes and wiring lines) are respectively formed on both surfaces of the single base film 31.

Figure 9:
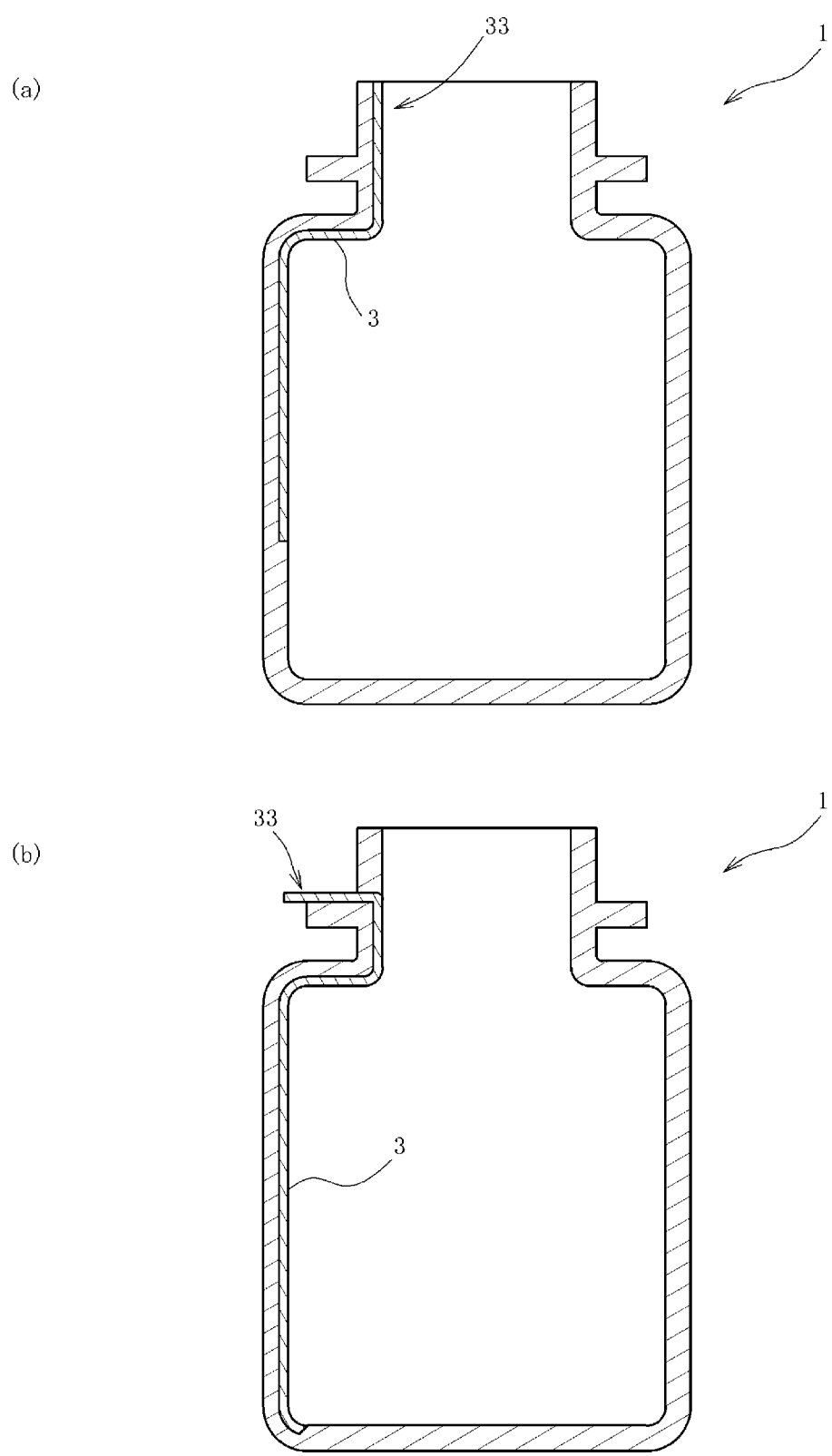
FIG. 9 is a schematic cross-sectional view illustrating an example of a conductive circuit-attached molded product in a case where an electronic component is mounted thereon.
Figure 10:
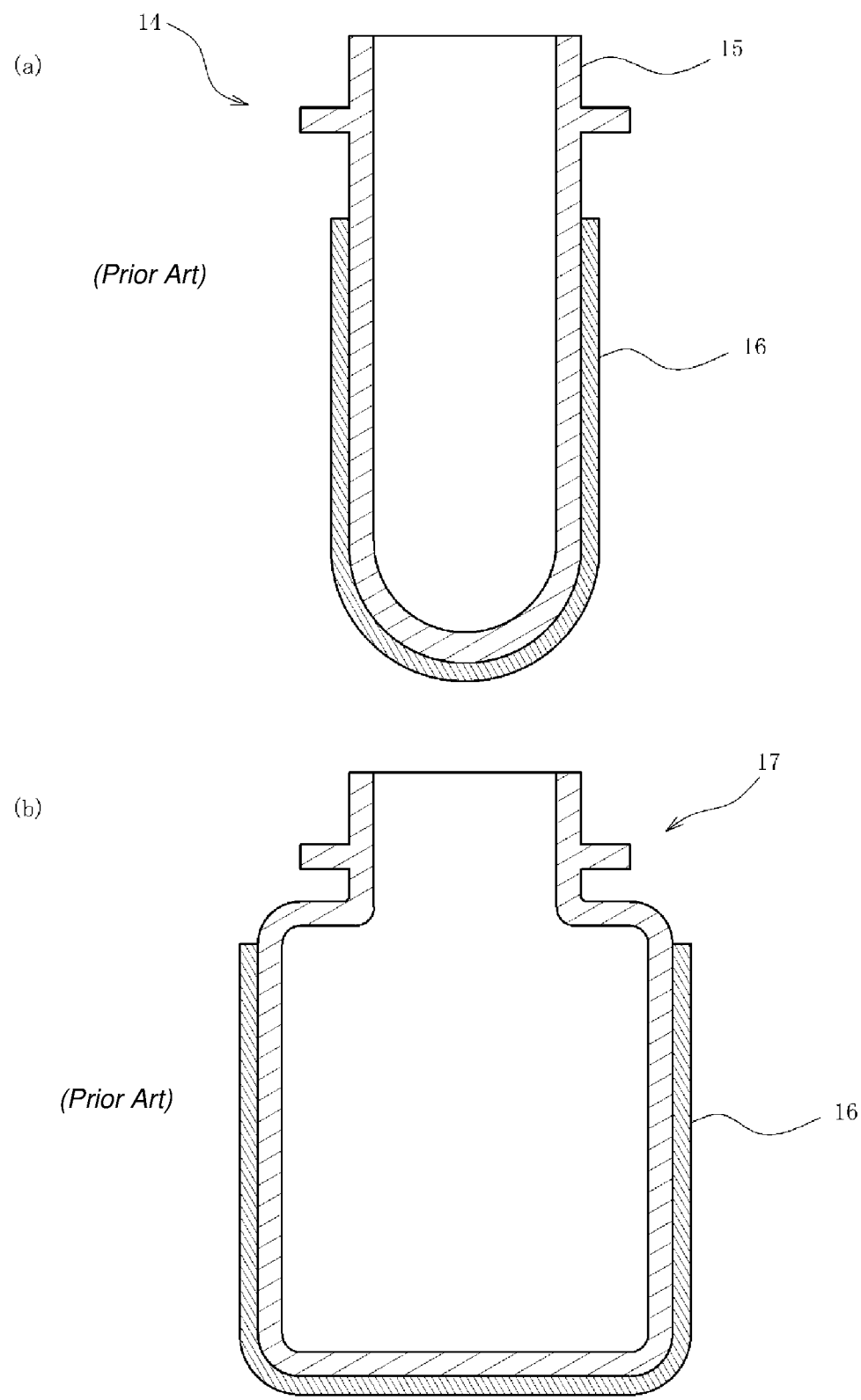
FIGS. 10(a) and 10(b) are schematic cross-sectional views illustrating a molded product formed using a conventional technique.

Since the conductive circuit-attached film 3 having the touch sensor structure is made of a material having stretchability, a trouble such as wire breakage of the conductive circuit is unlikely to occur even when blow molding is performed. The conductive circuit-attached film 3 is integrally molded with the preform in such a manner that a terminal 33 of the circuit is arranged at the mouth of the conductive circuit-attached molded product 1, for example (see FIGS. 9(a) and 9(b)). A touch sensor can be used by connecting a power source to the terminal 33. A self-generating element capable of generating power by, for example, vibrations, light, heat, electromagnetic waves or the like may be used as the power source. When such element is used as the power source, the touch sensor function may be also used without charging in a case where a user carries the conductive circuit-attached molded product 1 with him or her, for example.

The manufacturing method for the conductive circuit-attached molded product of the present disclosure may further include a step of mounting an electronic component on the conductive circuit 32 or the base film 31 in such a manner that the electronic component is electrically connected to the conductive circuit 32. For example, an IC (integrated circuit) chip or an LED may be used as the electronic component. In the case of an IC chip, the conductive circuit 32 (antenna), which is patterned in a shape that is electrically connected to an IC chip 11, is formed on the base film 31 by a print method using the above-described ink. The antenna is a portion through which a current generated when magnetic flux generated from a reader/writer passes through the antenna flows. This current is supplied from the antenna to the IC chip 11 to activate the IC chip 11, which makes it possible to exchange information with the reader/writer. Next, the antenna and the circuit of the IC chip 11 are electrically connected by a conductive adhesive or the like to achieve the conductive circuit-attached film 3 (see FIG. 7(*a*)). The conductive circuit-attached preform 2 can be achieved by insert-molding the conductive circuit-attached film 3 (see FIG. 7(*b*)). Further, by blow-molding the conductive circuit-attached preform 2, the conductive circuit-attached molded product 1 can be achieved.

When the conductive circuit-attached film 3 is insert-molded, the heat of the molten resin for molding the preform 4 is applied not only to the conductive circuit 32 (antenna) but also to the IC chip 11. Accordingly, it is preferable to select the IC chip 11 having heat resistance, form the protective layer 34 with a material having heat resistance, and the like. Note that the preform 4 may be molded by using colored resin. A drawing pattern layer may be formed to cover the conductive circuit 32 and the IC chip 11. The colored resin or the drawing pattern layer makes it possible to achieve the conductive circuit-attached preform 2 and the conductive circuit-attached molded product 1, where the conductive circuit-attached film 3 is not seen from the outside.

Figure 7:
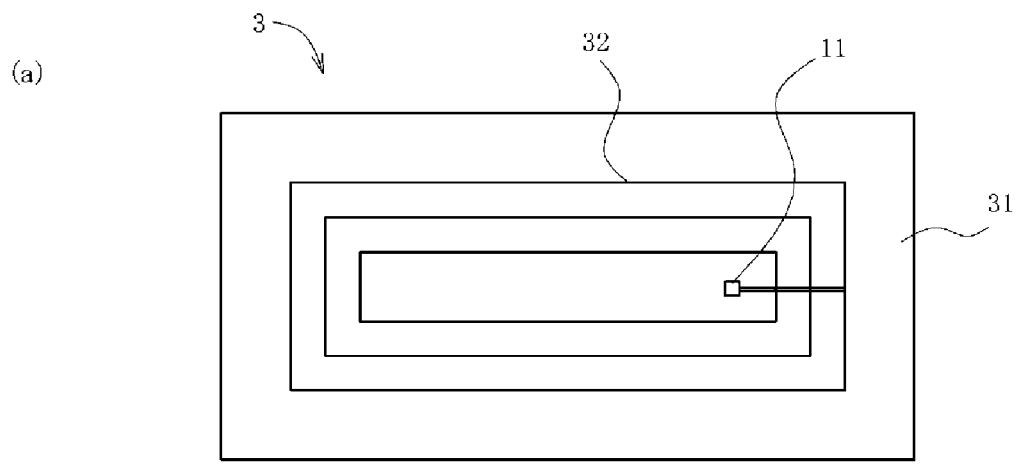
FIG. 7(a) is a schematic plan view illustrating an example of a conductive circuit-attached film on which an IC chip as an electronic component is mounted.
FIG. 7(b) is a schematic cross-sectional view illustrating an example of a conductive circuit-attached preform where a conductive circuit-attached film on which an IC chip is mounted is insert-molded.
FIG. 7(c) is a schematic cross-sectional view illustrating another example of a conductive circuit-attached preform where a conductive circuit-attached film on which an IC chip is mounted is insert-molded.
Figure 7:
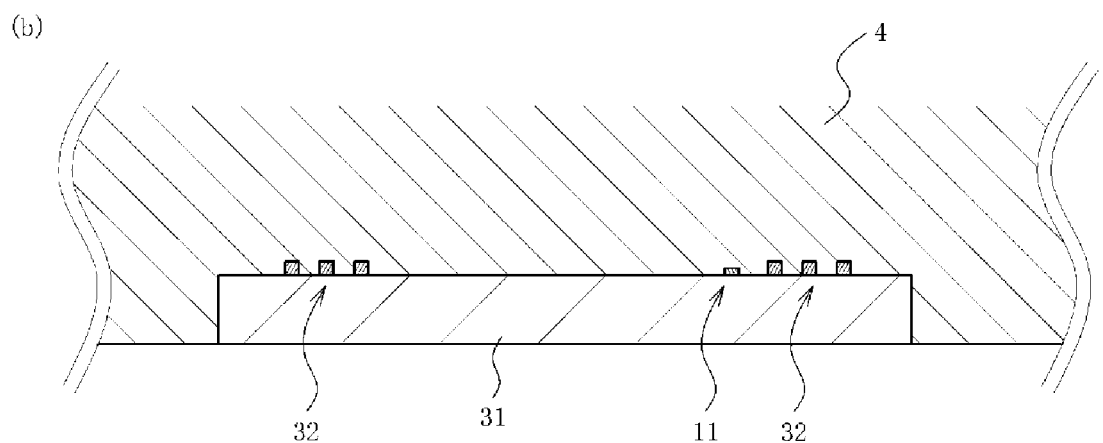
Figure 7:
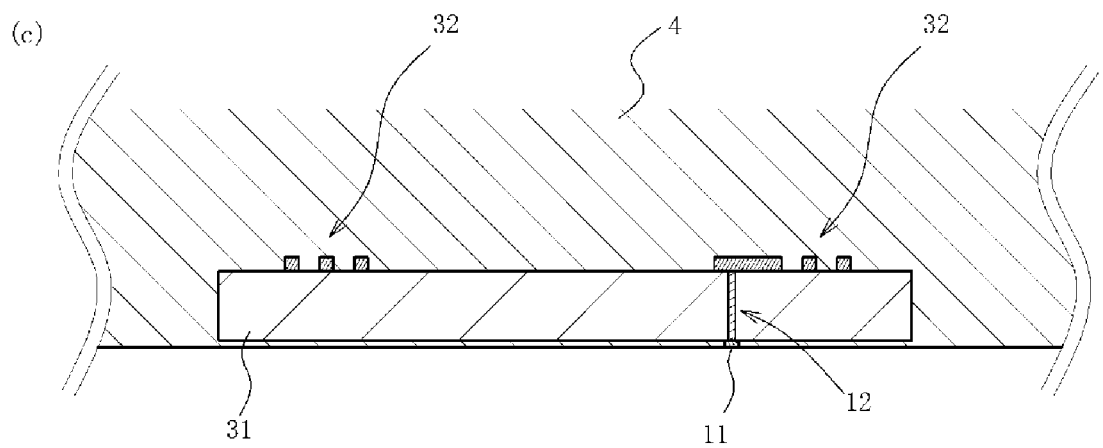

As illustrated in FIG. 7(*c*), it is also possible to form the conductive circuit 32 on one surface of the base film 31, and mount the IC chip 11 on the other surface thereof. In this case, a through hole is formed in the base film 31, and then the through hole is filled with a conductive material 12, so that the conductive circuit 32 and the IC chip 11 can be electrically conducted each other. Since the IC chip 11 is exposed on the inside of the preform 4, it is preferable to select the IC chip 11 having properties, such as waterproofing, dust resistance, chemical resistance and the like corresponding to the contents accommodated in the conductive circuit-attached molded product 1.

Figure 8:
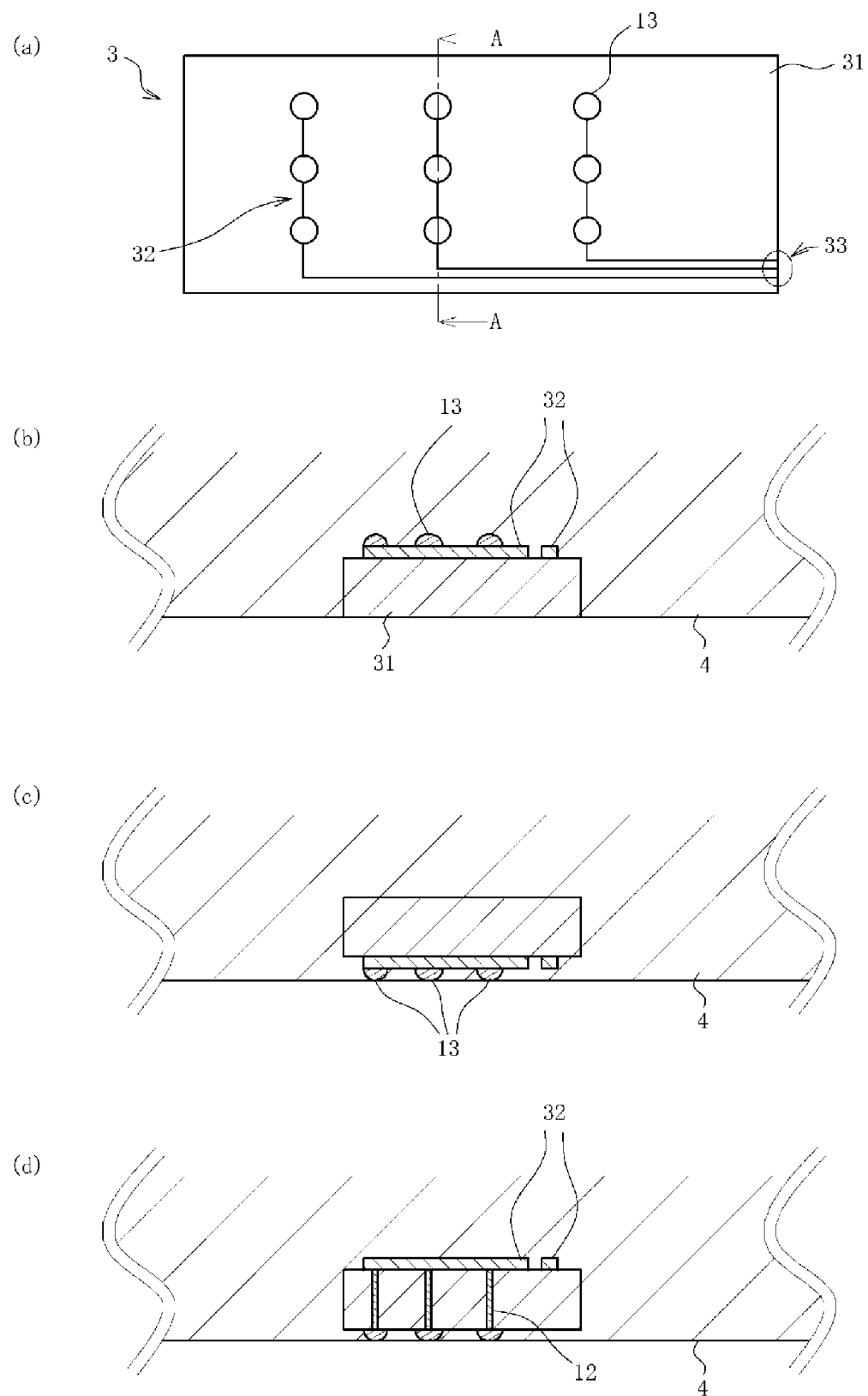
FIG. 8(a) is a schematic plan view illustrating an example of a conductive circuit-attached film on which an LED (light emitting diode) as an electronic component is mounted.
FIG. 8(b) is a schematic cross-sectional view illustrating an example of a conductive circuit-attached preform where a conductive circuit-attached film on which an LED is mounted is insert-molded.
FIG. 8(c) is a schematic cross-sectional view illustrating another example of a conductive circuit-attached preform where a conductive circuit-attached film on which an LED is mounted is insert-molded.
FIG. 8(d) is a schematic cross-sectional view illustrating another example of a conductive circuit-attached preform where a conductive circuit-attached film on which an LED is mounted is insert-molded.

LEDs may also be used as electronic components (see FIG. 8). The conductive circuit 32 (wiring lines) is formed on the base film 31 by the printing method using the above-described ink corresponding to an arrangement pattern of LEDs 13. Next, the conductive circuits 32 and the LEDs 13 are electrically connected each other by a conductive adhesive or the like to achieve the conductive circuit-attached film 3 (see FIG. 8(*a*)). The conductive circuit-attached preform 2 can be achieved by insert-molding the conductive circuit-attached film 3 (see FIG. 8(*b*)). Further, by blow-molding the conductive circuit-attached preform 2, the conductive circuit-attached molded product 1 can be achieved.

As in the case of the IC chip, it is also preferable to select the LED 13 having heat resistance, form the protective layer 34 with a material having heat resistance, and the like. Note that the preform 4 may be molded by using colored and transparent resin. A drawing pattern layer may be formed using the colored and transparent resin in such a manner as to cover the conductive circuit 32 and the LEDs 13. By using the colored and transparent resin, it is possible to achieve the conductive circuit-attached preform 2 having a higher decorative property due to the light of the LED than that in a case of using transparent resin, and the conductive circuit-attached molded product 1.

As illustrated in FIGS. 8(*c*) and 8(*d*), the conductive circuit-attached preform 2 may be molded in such a manner that the LEDs 13 face the inside of the preform 4. When a liquid is accommodated in the conductive circuit-attached molded product 1, the light of the LEDs 13 is refracted and scattered by the liquid, and an effect such that the liquid itself seems luminous may be achieved.

As illustrated in FIG. 8(*d*), it is also possible to form the conductive circuit 32 on one surface of the base film 31, and mount the LEDs 13 on the other surface thereof. In this case, a through hole is formed in the base film 31, and then the through hole is filled with the conductive material 12, so that the conductive circuit 32 and the LEDs 13 can be electrically conducted each other.

In addition to IC chips and LEDs, organic EL (electroluminescent) devices, various sensors (a pressure sensor, temperature sensor, gas sensor, liquid level sensor, acceleration sensor, gyroscopic sensor), vibration elements, and the like may be used as the electronic components.

The manufacturing method for the conductive circuit-attached molded product of the present disclosure may further include a step of mounting an electronic component on the conductive circuit-attached molded product 1 in such a manner that the electronic component is electrically connected to the conductive circuit 32. The above-described conductive circuit-attached molded product 1 is, for example, a molded product in which the conductive circuit-attached film 3 reaches the mouth of the conductive circuit-attached molded product 1. The conductive circuit 32 formed at the mouth is used as the terminal 33 for mounting the electronic component (see FIGS. 9(*a*) and 9(*b*)). An energy harvesting element, a display module, a touch sensor module, or the like may be used as the electronic component.

INDUSTRIAL APPLICABILITY

The conductive circuit-attached molded product of the present disclosure may also be used for inspection, detection, measurement, and the like of the contents accommodated in the molded product.

The invention claimed is:

1. A manufacturing method for a conductive circuit-attached molded product, the method comprising:
    arranging a conductive circuit-attached film, in which a conductive circuit having stretchability is formed on a first surface of a base film, on a molding surface of a first mold having the molding surface for forming an internal surface of a preform;
    mold-clamping the first mold and a second mold paired with the first mold;
    molding the preform by injecting molten resin into a cavity formed by the mold-clamping;
    mold-opening the first mold and the second mold;
    taking out a conductive circuit-attached preform in which the conductive circuit-attached film and the preform are integrated;
    blow-molding the conductive circuit-attached preform;
    mounting an electronic component on a second surface of the base film in such a manner that the electronic component is electrically connected to the conductive circuit and the electronic component faces the internal surface of the preform.

2. The manufacturing method for the conductive circuit-attached molded product according to claim 1, wherein, the molding surface on which the conductive circuit-attached film is arranged is at least one location among the molding surfaces for forming a mouth, a body, and a base portion of the preform.

3. The manufacturing method for the conductive circuit-attached molded product according to claim 1, wherein
the conductive circuit-attached film has a touch sensor structure.

4. The manufacturing method for the conductive circuit-attached molded product according to claim 1, further comprising:
mounting an electronic component on the conductive circuit or the base film in such a manner that the electronic component is electrically connected to the conductive circuit.

5. The manufacturing method for the conductive circuit-attached molded product according to claim 1, further comprising:
mounting an electronic component on the conductive circuit-attached molded product in such a manner that the electronic component is electrically connected to the conductive circuit.

6. A conductive circuit-attached molded product achieved by blow molding, wherein
a conductive circuit-attached film in which a conductive circuit having stretchability is formed on a first surface of a base film, is integrally molded on an internal surface of the conductive circuit-attached molded product, and a surface of the conductive circuit-attached film is exposed from an internal surface of the conductive circuit-attached molded product; and
an electronic component, mounted on a second surface of the base film in such a manner that the electronic component is electrically connected to the conductive circuit and the electronic component faces the internal surface of the preform.

7. A conductive circuit-attached preform configured to achieve a conductive circuit-attached molded product by blow molding, the preform comprising:
a conductive circuit-attached film in which a conductive circuit having stretchability is formed on a first surface of a base film, and which is arranged on an internal surface of the preform; and
an electronic component, mounted on a second surface of the base film in such a manner that the electronic component is electrically connected to the conductive circuit and the electronic component faces the internal surface of the preform.

8. The conductive circuit-attached preform according to claim 7, further comprising:
an electronic component mounted on the conductive circuit or the base film in such a manner that the electronic component is electrically connected to the conductive circuit.

9. The manufacturing method for the conductive circuit-attached molded product according to claim 2, wherein
the conductive circuit-attached film has a touch sensor structure.

10. The manufacturing method for the conductive circuit-attached molded product according to claim 2, further comprising:
mounting an electronic component on the conductive circuit or the base film in such a manner that the electronic component is electrically connected to the conductive circuit.

11. The manufacturing method for the conductive circuit-attached molded product according to claim 2, further comprising:
mounting an electronic component on the conductive circuit-attached molded product in such a manner that the electronic component is electrically connected to the conductive circuit.

12. A manufacturing method for a conductive circuit-attached preform according to claim 7, the method comprising:
arranging a conductive circuit-attached film, in which a conductive circuit having stretchability is formed on a base film, on a molding surface of a first mold having the molding surface for forming an internal surface of a preform;
mold-clamping the first mold and a second mold paired with the first mold;
molding the preform by injecting molten resin into a cavity formed by the mold-clamping;
mold-opening the first mold and the second mold; and
taking out the conductive circuit-attached preform in which the conductive circuit-attached film and the preform are integrated.

13. The manufacturing method of claim 1, wherein the electronic component is electrically connected to the conductive circuit through a hole that penetrates through the base film.

14. The manufacturing method of claim 13, wherein the electronic component comprises a light emitting diode (LED).

15. The manufacturing method of claim 13, wherein the electronic component comprises an integrated circuit (IC) chip.

16. The manufacturing method of claim 13, wherein a material of the base film is same as a material of the preform.

\* \* \* \* \*